3,382,061
TRIAZENECARBOXAMIDES AND TRIAZENE-
CARBOXANILIDES AS HERBICIDES
Donald David Bondarenko, Trenton, and Bryant Leonidas
Walworth, Pennington, N.J., assignors to American
Cyanamid Company, Stamford, Conn., a corporation
of Maine
No Drawing. Filed Apr. 22, 1965, Ser. No. 450,187
9 Claims. (Cl. 71—120)

ABSTRACT OF THE DISCLOSURE

Herbicidal compositions containing as the active ingredient thereof 3-triazenecarboxamides of the formula:

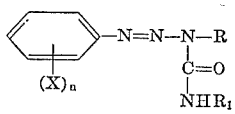

wherein:
R is lower alkyl or

X is hydrogen, halogen, lower alkyl, lower alkoxy or nitro;
$R_1$ is lower alkyl, alkenyl, benzyl or

Y is hydrogen, halogen or lower alkyl; and
n is an integer from 1 to 2, are provided.

The present invention relates to the utilization of herbicidal compositions. More particularly, it relates to a method for controlling undesirable plants utilizing a composition containing as an active ingredient in herbicidally effective amounts a 3-triazenecarboxamide represented by the formula:

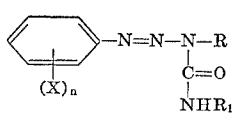

wherein R is lower alkyl or

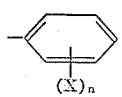

X is selected from the group consisting of hydrogen, halogen, lower alkyl, lower alkoxy and nitro; $R_1$ is selected from the group consisting of alkyl, alkenyl, benzyl, and

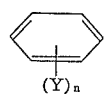

Y is hydrogen, halogen or lower alkyl; n is an integer of 1 or 2.

Illustrative 3-triazenecarboxamide compounds which can be employed in the invention are:

3-methyl-1-phenyl-3-triazenecarboxanilide,
N-methyl-1,3-diphenyl-3-triazenecarboxamide,
N-ethyl-1,3-diphenyl-3-triazenecarboxamide,
N-n-propyl-1,3-diphenyl-3-triazenecarboxamide,
N-isopropyl-1,3-diphenyl-3-triazenecarboxamide,
N-n-butyl-1,3-diphenyl-3-triazenecarboxamide,
N-allyl-1,3-diphenyl-3-triazenecarboxamide,
N-methyl-1,3-di(p-tolyl)-3-triazenecarboxamide,
N-methyl-1,3-bis(p-chlorophenyl)-3-triazenecarboxamide,
N-methyl-1,3-bis(p-nitrophenyl)-3-triazenecarboxamide,
N-methyl-3-methyl-1-phenyl-3-triazenecarboxamide,
N-ethyl-3-ethyl-1-phenyl-3-triazenecarboxamide,
N-methyl-1,3-bis(3,4-dichlorophenyl)-3-triazenecarboxamide,
N-benzyl-1,3-diphenyl-3-triazenecarboxamide,
N-phenyl-3-methyl-3-triazenecarboxamide,
N-methyl-1,3-bis(p-bromophenyl)-3-triazenecarboxamide,
N-nonenyl(1,2)-1,3-diphenyl-3-triazenecarboxamide,
N-(9-decenyl)-1,3-diphenyl-3-triazenecarboxamide,
N-phenyl-1,3-diphenyl-3-triazenecarboxamide,
N-p-chlorophenyl-3-p-chlorophenyl-1-phenyl-3-triazenecarboxamide, and
N-p-bromophenyl-1,3-diphenyl-3-triazenecarboxamide.

The 3-triazenecarboxamides employed in the compositions of the present invention can be prepared in a straightforward manner. The procedure involves the admixture of (1) a triazene of the formula:

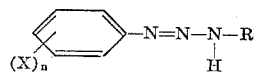

wherein X, R and n are each as defined above, with (2) an isocyanate of the formula:

$$R_1NC=O$$

wherein $R_1$ is as described above, in the presence of an inert organic solvent, such as anhydrous ether, methylene chloride or toluene. The mixture is permitted to remain at room temperature for several hours and then refluxed for about one hour. Evaporation to about approximately one-third its original volume is effected and then cooled.

Resulting product is separated from the reaction mixture and has the formula:

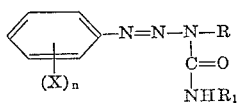

wherein X, R, R₁ and n are as defined above.

The 3-triazenecarboxamide compounds have been found to be highly effective herbicides. They exhibit broad-spectrum activity when applied to the foliage of plants, are very selective in preemergence applications, and may be used effectively as aquatic herbicides.

In general, the 3-triazenecarboxamides of the present invention are poorly-soluble in water. Liquid compositions may be prepared by dissolving the compounds initially in a variety of organic solvents and then admixing the latter with water, either with or without an emulsifying agent. Exemplary organic solvents are, for instance, acetone, methyl isobutyl ketone, dioxane, isopropyl acetate, ethanol, xylene, dimethyl sulfoxide, dimethylformamide, nitroparaffins, cyclohexanone, aromatic naphthas, and equivalents thereof.

Advantageously, the compounds of the instant invention can be formulated as emulsifiable concentrates by employing selectively any of the aforementioned organic solvents and a small amount of an emulsifying agent. Further, the compounds lend themselves to formulations as granulars, dusts, and wettable powders. Illustrative solid carriers which may be used in solid formulations include: talc, clays, pumice, chalk, diatomaceous earth and vermiculite. If desired, small amounts of wetting agents, emulsifiers, and surface active agents, may also be added to such formulations.

Surface active agents or emulsifiers, which can be herein employed, are those normally used in the preparation of oil-in-water emulsions. Illustrative of the latter are ionic and non-ionic dispersing or emulsifying agents, such as the higher alkylaryl sulfonates, polyoxyethylene esters, polyglycol ethers, and sodium dioctyl sulfosuccinate. Advantageously, the emulsifying agents are employed in low concentrations, usually in the range of from about 0.1% to about 2% by weight of the total weight of final solutions which may be used as a spray.

In general, the amount of 3-triazenecarboxamide compound in the herbicidal composition will vary in the manner and purpose for which the composition is to be so-employed. Concentrations for subsequent use in preparing, for instance, spray solutions, may contain as much as 90% or more by weight of the active ingredient. Sprays, dusts or granulars for direct use will be relatively dilute, in some instances as low as 0.5%, or less.

The invention will be further illustrated by the following examples. These are not to be taken as limitative of the invention. Unless otherwise noted, all parts are by weight.

Exemplary preparations of 3-triazenecarboxamides are presented in Examples A through L.

Example A.—Preparation of N-ethyl-1,3-diphenyl-3-triazenecarboxamide

A solution of 3.9 parts of ethylisocyanate in 50 parts by volume of dry diethyl ether is mixed with a solution of 10.0 parts of 1,3-diphenyltriazene in 50 parts by volume of dry diethyl ether. After standing at room temperature for one hour, the precipitated compound is collected, washed with ether, and dried under reduced pressure at room temperature. The compound melts at 126°–127° C. with decomposition.

Substituting methylisocyanate for ethylisocyanate in the above procedure, a good yield of N-methyl-1,3-diphenyl-3-triazenecarboxamide, melting at 103°–105° C., is obtained.

Example B.—Preparation of N-isopropyl-1,3-diphenyl-3-triazenecarboxamide

Following the procedure of Example A, but using an equimolar quantity isopropyl isocyanate in lieu of ethyl isocyanate, the above compound is obtained, melting point 110° C. with decomposition.

Example C.—Preparation of N-(9-decenyl)-1,3-diphenyl-3-triazenecarboxamide

In a suitable flask 9.9 parts of 1,3-diphenyltriazene dissolved in 100 ml. of ether are treated with 9.06 parts of 9-deceneisocyanate dissolved in 15 parts by volume of ether. The solution is then allowed to stand at room temperature for 24 hours. The mixture is subjected to reduced pressure causing a sudden formation of crystals which solidify the medium. The mass is filtered, washed with ether and twice with hexane leaving (A) a pale yellow powder, wt. 7.0 parts, melting point 71°–72° C. The mother liquor and washings on standing deposit a second crop, which is filtered and washed as above giving (B) a yellow powder, wt. 5.0 parts, melting point 68.3°–69.5° C. Recrystallization of B from hexane gives (C) wt. 3.2 parts, melting point 71°–72° C., yielding a total of 10.2 parts which is equivalent to 54% of theoretical.

Example D.—Preparation of N-allyl-1,3-diphenyl-3-triazenecarboxamide

In a suitable flask are dissolved 9.9 parts of 1,3-diphenyltriazene in 75 parts by volume of ether and 4.15 parts of allyl isocyanate in 10 parts by volume of ether at room temperature. After standing at room temperature for 24 hours and at 3° C. for three days the crystals are filtered, washed with ether and hexane and dried leaving pale yellow crystals, wt. 0.8 part, melting point 110°–111° C. with decomposition.

Example E.—Preparation of N-allyl-1,3-bis(4-chlorophenyl)-3-triazenecarboxamide

The compound is prepared by the procedure of Example D, an equimolar quantity of 1,3-bis(4-chlorophenyl)-triazene replacing the 1,3-diphenyltriazene. The pure compound melts at 115° C. with decomposition.

Example F.—Preparation of N-allyl-1,3-bis(p-methoxyphenyl)-3-triazenecarboxamide The general procedure of Example A is repeated. From this reaction of allyl isocyanate with 1,3-bis(p-methoxyphenyl)-triazene in ether the above compound is obtained, melting point 80°–82° C. with decomposition.

Example G.—Preparation of N-ethyl-1,3-bis(p-methoxyphenyl)-3-triazenecarboxamide Following the procedure of Example A and reacting ethyl isocyanate with 1,3-bis(p-methoxyphenyl)-triazene in ether the above compound is obtained, melting point 93°–94° C. with decomposition.

Example H.—Preparation of N-allyl-1,3-bis(o-methoxyphenyl)-3-triazenecarboxamide The general procedure of Example A is repeated. From the reaction of allyl isocyanate with 1,3-bis(o-methoxyphenly)-triazene in ether the above compound is obtained, melting point 112° C. with decomposition.

Example I.—Preparation of N-ethyl-1,3-bis(o-methoxyphenyl)-3-triazenecarboxamide When the procedure of Example A is used and ethyl isocyanate is reacted with 1,3-bis(o-methoxyphenyl)-triazene in ether the above compound is obtained, melting point 123°–125° C. with decomposition.

Example J.—Preparation of N-ethyl-1,3-bis(p-ethylphenyl)-3-triazenecarboxamide The general procedure of Example A is repeated. From the reaction of ethyl isocyanate with 1,3-bis(p-ethylphenyl)-triazene in ether the above compound is obtained, melting point 116°–118° C. with decomposition.

Example K.—Preparation of N-methyl-1,3-bis(p-methoxyphenyl)-3-triazenecarboxamide When the procedure of Example A is repeated using methyl isocyanate and 1,3-bis(p-methoxyphenyl)-triazene, the above compound is obtained, melting point 121°–123° C. with decomposition.

Example L.—Preparation of 3-methyl-1-phenyl-3-triazenecarboxanilide

Following the procedure of Example A in every detail except that equimolar amounts of 3-methyl-1-phenyl-3-triazene and phenylisocyanate are reacted, a good yield of the above compound, melting at 104° C., is obtained.

In the following examples, herbicidal utility is illustrated.

Example 1

Selective preemergence herbicidal activity of the compounds of the instant invention is exemplified by the following tests wherein seeds of a variety of monocotyledonous and dicotyledonous plants are separately mixed in potting soil and planted on top of approximately one inch of potting soil in separate pint cups. Compounds to be tested are dissolved in water or in a small amount of an organic solvent and then dispersed in water in sufficient quantity to provide the equivalent of 1, 2, 3, or 5 pounds of test compound per acre when they are sprayed with the prepared solutions for a predetermined time. After spraying, the cups are placed on greenhouse benches and cared for in the usual manner. Two to four weeks after treatment the test is terminated and each cup is examined to determine the effect of each compound on the various plant species. Each cup is rated according to the Herbitoxicity Index given below and the results of the tests are provided in Table I below. It will be noted from an examination of the table that the compounds of the invention are highly effective preemergence herbicides against a wide variety of monocotyledonous and dicotyledonous plants. The data also establish that the compounds of the instant invention cause little if any injury to several species of crop plants to which they were applied.

TABLE I.—PREEMERGENCE

| Compound | Rate, lbs./acre | Herbicidal Activity [1] | | | | | | | | | | | | | | | |
|---|---|---|---|---|---|---|---|---|---|---|---|---|---|---|---|---|---|
| | | Jimsonweed | Kochia | Lambsquarter | Mustard | Pigweed | Purslane | Velvetleaf | Barnyardgrass | Crabgrass | Giant foxtail | Green foxtail | Wild Oats | Corn | Cotton | Peanuts | Potatoes |
| ⟨phenyl⟩—N=N—N—⟨phenyl⟩, C=O, NH—CH₃ | 1, 2, 3 | 8, 9, 9 | 5, 9, — | 9—, 9, 9 | 9—, 9, 9 | 9, 9, 9 | 9, 9, 9 | 9, 9, — | 6, 8, 9— | 7, 8, 9 | 6, 7, 9 | —, —, 7 | 8, 9—, 9 | 0m, m, 3m | tm, m, m | tm, m, s | 0, 0, — |
| ⟨phenyl⟩—N=N—N—⟨phenyl⟩, C=O, NH—C₂H₅ | 3 | — | — | 6s | 8s | 9 | — | — | 5 | 6 | — | 5 | — | 0 | m | — | — |
| ⟨phenyl⟩—N=N—N—⟨phenyl⟩, C=O, NH—C₃H₇ | 5 | — | 9— | — | 9— | 0 | — | 3 | 0 | s | — | — | 3 | — | — | — | — |
| ⟨phenyl⟩—N=N—N—⟨phenyl⟩, C=O, NH—CH(CH₃)₂ | 5 | — | — | 9— | — | 5 | — | — | — | — | — | — | s | — | — | — | — |
| ⟨phenyl⟩—N=N—N—⟨phenyl⟩, C=O, NH—C₄H₉-n | 5 | — | — | 7 | — | m | — | — | — | — | — | — | s | — | — | — | — |

TABLE I.—PREEMERGENCE —Continued

| Compound | Rate, lbs./acre | Jimsonweed | Kochia | Lambsquarter | Mustard | Pigweed | Purslane | Velvetleaf | Barnyardgrass | Crabgrass | Giant foxtail | Green foxtail | Wild Oats | Corn | Cotton | Peanuts | Potatoes |
|---|---|---|---|---|---|---|---|---|---|---|---|---|---|---|---|---|---|
| 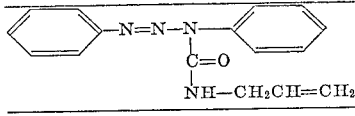 | 2<br>5 | —<br>— | —<br>— | —<br>— | 9—<br>9 | 5<br>9 | —<br>9 | —<br>— | —<br>— | t<br>9— | 0<br>9— | —<br>— | t<br>9 | 0<br>— | 0<br>— | —<br>— | —<br>— |
| 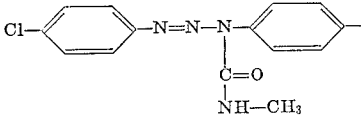 | 3 | 3 | — | 9 | 7 | 8 | — | — | 7 | 7 | 6 | — | 7 | 0 | 0 | 0 | 0 |
| 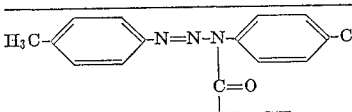 | 3 | 7 | — | 9 | 9 | 9 | — | — | 5 | 8m | 5 | — | 6 | t | 0 | 0 | t |
| 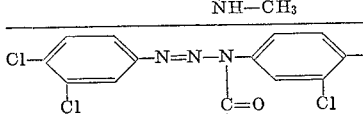 | 5 | — | 0 | 6 | 0 | 4 | — | — | 5 | 0 | 2 | — | 5 | — | — | — | — |
| 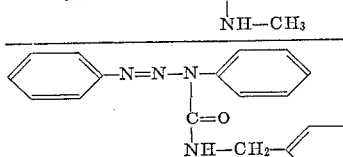 | 5 | — | — | — | t | 0 | 9— | — | 0 | 0 | — | — | 0 | — | — | — | — |
| 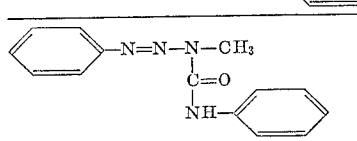 | 1<br>3 | t<br>0 | —<br>— | 9<br>9 | —<br>— | 8s<br>9 | —<br>— | —<br>— | 2<br>8s | 8m<br>9— | 0<br>4 | —<br>— | 0<br>7s | 0<br>m | 0<br>t | —<br>— | —<br>— |

[1] Herbicidal Activity or Herbitoxicity Index:
9=100% reduction in stand.
9—=1 or 2 stunted plants remaining.
8=85—<100% reduction in stand.
7=70—<85% reduction in stand.
6=60—<70% reduction in stand.
5=50—<60% reduction in stand.
4=40—<50% reduction in stand.
3=30—<40% reduction in stand.
2=20—<30% reduction in stand.
1=10—<20% reduction in stand.
0=No apparent effect.
s=Severe injury.
m=Moderate injury.
t=Trace to slight injury.

Example 2

The postemergence activity of the compounds of the invention is exemplified by the following tests wherein the test compounds are applied at various rates of application to a variety of monocotyledonous and dicotyledonous plants. The test compounds are dissolved in 50/50 acetone/water mixtures in sufficient quantity to provide the equivalent of 1, 2, 3, 5 and 10 pounds per acre of compound when said solutions are sprayed on the plants for a predetermined time at a pressure of 30 p.s.i. After spraying, the plants are placed on greenhouse benches and cared for in the usual manner. Two to four weeks after spraying all plants are examined and rated according to the Herbitoxicity Index set forth in Table I above. The results are given in Table II below and clearly indicate a high degree of postemergence activity against a large variety of monocotyledonous and dicotyledonous plants.

TABLE II.—POSTEMERGENCE

| Compound | Rate lbs./acre | Bindweed | Canada Thistle | Johnsongrass | Nutsedge | Quackgrass | Kochia | Lambsquarter | Mustard | Pigweed | Purslane | Giant Foxtail | Barnyardgrass | Crabgrass | Green Foxtail | Wild Oats | Corn | Cotton | Radish | Sugar beet | Soybean | Tomato | Wheat |
|---|---|---|---|---|---|---|---|---|---|---|---|---|---|---|---|---|---|---|---|---|---|---|---|
| ⌬—N=N—N⌬ / C=O / NH—CH₃ | 1 2 10 | — 8s 9 | — 9 9 | — t 9 | — 0 t | — m 9 | 9 9 — | s 9 9 | 9 9 9 | 9 9 9 | — — — | t 8 — | t 5 9 | t 6 9 | — — — | m 5 9 | t — — | 9— — — | — 9 — | 7s — — | s — — | — 9 — | — 4s — |
| ⌬—N=N—N⌬ / C=O / NH—C₂H₅ | 10 | 9 | r | 0 | 0 | 9 | — | — | — | — | — | — | — | 8 | — | 9 | — | — | 9 | — | — | — | 9 |
| ⌬—N=N—N⌬ / C=O / NH—CH₂CH=CH₂ | 10 | t | t | — | — | 0 | — | — | 9 | — | 9 | — | — | 0 | — | 9 | — | — | — | — | — | — | — |
| Cl-⌬—N=N—N⌬ / C=O / NH—CH₃ | 2 10 | t s | t m | 0 0 | 0 0 | 0 0 | s s | 9— s | 9— 9— | s s | — — | — — | t s | t t | 9— 9 | 9— 9— | — — | — — | — — | — — | — — | — — | — — |
| H₃C-⌬—N=N—N⌬ / C=O / NH—CH₃ | 2 10 | 0 0 | 0 0 | 0 0 | 0 0 | 0 0 | t t | m m | 9— 9— | s m | — — | — — | 0 0 | 0 0 | 0 0 | s m | — — | — — | — — | — — | — — | — — | — — |
| Cl-⌬(Cl)—N=N—N⌬ / C=O / NH—CH₃ | 1 5 | — — | — — | — — | — — | — — | 9 9 | 9 9 | 9 9 | 9 9 | — — | 3 3 | 0 t | t t | 0 0 | t m | t t | 9 9 | — — | 9 9 | 9 9 | — — | — — |
| ⌬—N=N—N—CH₃ / C=O / NH—⌬ | 1 3 | — — | — — | — — | — — | — — | 5 9 | 5 9 | 5 9 | 5 9 | — — | 0 5 | 0 t | 0 3 | — — | 6 9 | — — | — — | — — | — — | — — | — — | — — |

[1] Herbicidal Activity—See Table I.

Example 3.—Evaluation of aquatic herbicides

The test plants used in the aquatic herbicide evaluation program are Anacharis, watermilfoil, duckweed, azola, and green algae.

The procedure involves planting one sprig about 10 inches long of each Anacharis and watermilfoil in about two inches of soil at the bottom of a four-liter wide-mouth glass container. The container is then filled with tap water. About 50 plants of each azola and duckweed are placed on the surface of the water which is simultaneously inoculated with about two milliliters of green algae stock solution.

The system is allowed to acclimate for three days prior to introduction of a test compound. The standard rate of treatment is 5 p.p.m., obtained by adding 20 milligrams per container. An equal volume of polyoxyethylene sorbitan monolaurate is added. Compounds insoluble in water are first solubilized in one milliliter of acetone. Checks are included for comparison.

The systems are observed periodically and evaluated at the end of three of four weeks. Active compounds are re-evaluated at lower rates in Table III.

TABLE III.—AQUATIC HERBICIDE DATA

| Compound | Rate, p.p.m. | Reduction in Stand, Percent | | | | |
| --- | --- | --- | --- | --- | --- | --- |
| | | Anacharis | Water-milfoil | Duck-weed | Azola | Green Algae |
| 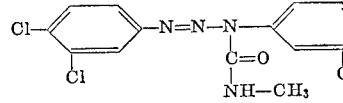 | 5 | 100 | 100 | 100 | 100 | 100 |
| 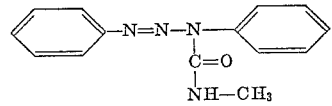 | 5 | 0 | 0 | 100 | 100 | 0 |
| 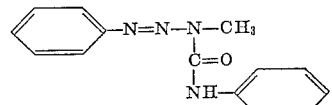 | 5 | 0 | 0 | 100 | 100 | 0 |

Example 4

To evaluate the effectiveness of the compounds of the invention for controlling monocotyledonous and dicotyledonous plants, a sufficient amount of test compound is dissolved in a Difco-Bacto agar to provide approximately 500 p.p.m. of test compound in the agar. The agar is poured into small wide-mouth bottles and allowed to harden. Seeds of wheat, corn, radish and cucumber are then plated on the agar surface and two milliliters of water is added to aid germination. The bottles are covered for 48 hours to minimize escape of volatile chemicals then covered with kraft paper to further aid germination. The seeds and plants are observed periodically and water added as required. Three weeks after initial exposure, the seeds and plants are examined and the results recorded. Table IV below demonstrates the herbicidal effectiveness of the test compounds against the various plant species in test.

TABLE IV

| Compound (500 p.p.m. rate) | Percent Kill of Plant Species | | | |
| --- | --- | --- | --- | --- |
| | Wheat | Radish | Cucumber | Corn |
| 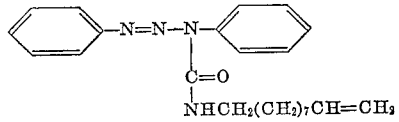 | 100 | 100 | 100 | 100 |
| 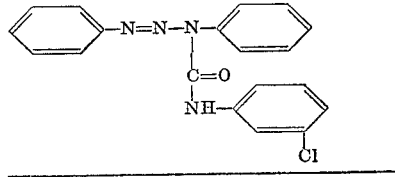 | 0 | 100 | 100 | 100 |
| 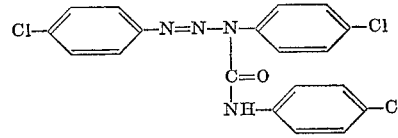 | 0 | 100 | 0 | 100 |
| 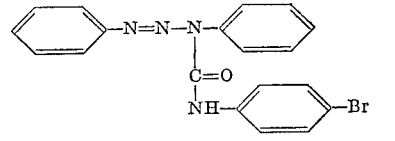 | 100 | 100 | 0 | 100 |

It is an advantage of the present invention that both annual broadleaf and annual grass weeds as well as certain perennial weeds which germinate from seed, can be controlled. When the compounds above-defined are applied preemergence, high selectivity is observed. Significantly, these compounds are highly toxic to weeds but are not herbicidally active against crops. For instance, various crops including corn, sugar cane, sorghum, cotton, peanuts, and potatoes are tolerant of the compounds of the instant invention. This selectivity is highly desirable in that the compounds can be used in the presence of such crops without adversely affecting them.

In practice, the compositions of the invention can be applied to the soil at the time of planting or after planting and preferably, prior to crop emergence. Alternatively, they can be applied as directed basal treatments around emerged crops. Further, the process of the invention can be employed in orchards and vineyards. The compounds of the instant invention also may be beneficially employed in noncropland areas where either a preemergence treatment or a postemergence treatment with residual preemergence activity is desired to suppress unwanted vegetation, as for example, around railroad tracks, lumber yards, industrial sites and oil tank farms.

What is claimed is:

1. A method of controlling undesirable plant growth comprising: applying to an area to be protected from such plant growth a herbicidally effective amount of a 3-triazenecarboxamide compound of the formula:

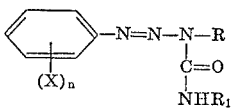

wherein R represents a radical selected from the group consisting of lower alkyl and

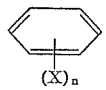

in which X is a member selected from the group consisting of hydrogen, halogen, lower alkyl, lower alkoxy and nitro and $n$ is an integer selected from the group consisting of 1 and 2; $R_1$ represents a member selected from the group consisting of lower alkyl, lower alkenyl, benzyl and

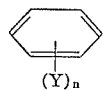

in which Y is a member selected from the group consisting of hydrogen, halogen and lower alkyl and $n$ is an integer selected from the group consisting of 1 and 2, and wherein at least one member of the group consisting of R and $R_1$ is aryl.

2. A method according to claim 1 wherein the area to be protected contains undesirable seed.

3. A method according to claim 1 wherein the 3-triazenecarboxamide compound is: 3-methyl-1-phenyl-3-triazenecarboxanilide.

4. A method according to claim 1 wherein the 3-triazenecarboxamide compound is: N-allyl-1,3-diphenyl-3-triazenecarboxamide.

5. A method according to claim 1 wherein the 3-triazenecarboxamide compound is: N-methyl-1,3-diphenyl-3-triazenecarboxamide.

6. A method according to claim 1 wherein the 3-triazenecarboxamide compound is: 1,3-bis(3,4-dichlorophenyl)-N-methyl-3-triazenecarboxamide.

7. A method according to claim 1 wherein the 3-triazenecarboxamide compound is: 1,3-bis(p-chlorophenyl)-N-methyl-3-triazenecarboxamide.

8. A method according to claim 1 wherein the 3-triazenecarboxamide compound is: N-methyl-1,3-di-p-tolyl-3-triazenecarboxamide.

9. A method according to claim 1 wherein the 3-triazenecarboxamide compound is: N-(9-decenyl)-1,3-diphenyl-3-triazenecarboxamide.

References Cited

UNITED STATES PATENTS

| 3,242,209 | 3/1966 | Jentzsch et al. | 260—553 |
| 3,138,521 | 6/1964 | Jelinek et al. | 167—30 |
| 3,299,038 | 1/1967 | Tomcufcik et al. | 260—140 |

FOREIGN PATENTS

| 893,437 | 4/1962 | Great Britain. |

OTHER REFERENCES

Thompson et al.: Botan. Gas. 107, 476–482, 491 (1946).

LEWIS GOTTS, *Primary Examiner.*

M. M. KASSENOFF, *Assistant Examiner.*